United States Patent
Debord et al.

(10) Patent No.: US 7,248,147 B2
(45) Date of Patent: Jul. 24, 2007

(54) PERISHABLE PRODUCT ELECTRONIC LABEL INCLUDING TIME AND TEMPERATURE MEASUREMENT

(75) Inventors: Wayne K. Debord, Indianapolis, IN (US); James Hatchett, Eagle, ID (US); Thomas Jensen, Boise, ID (US)

(73) Assignee: PakSense, LLC, Boise, ID (US)

( * ) Notice: Subject to any disclaimer, the term of this patent is extended or adjusted under 35 U.S.C. 154(b) by 0 days.

(21) Appl. No.: 11/221,540

(22) Filed: Sep. 7, 2005

(65) Prior Publication Data

US 2006/0061454 A1 Mar. 23, 2006

Related U.S. Application Data

(63) Continuation-in-part of application No. PCT/US2004/007101, filed on Mar. 8, 2004, and a continuation-in-part of application No. 10/688,798, filed on Oct. 17, 2003, now Pat. No. 7,057,495.

(60) Provisional application No. 60/453,354, filed on Mar. 7, 2003, provisional application No. 60/419,695, filed on Oct. 17, 2002.

(51) Int. Cl.
*G08B 1/00* (2006.01)

(52) U.S. Cl. ............... 340/309.16; 340/309.7; 340/539.19; 340/584; 340/588; 340/870.17

(58) Field of Classification Search ........... 340/309.16, 340/309.14, 309.15, 539.1, 584, 588, 309.7, 340/539.19, 870.17; 368/10, 11, 28; 377/20, 377/25, 141
See application file for complete search history.

(56) References Cited

U.S. PATENT DOCUMENTS

| | | | | |
|---|---|---|---|---|
| 5,442,669 | A | * 8/1995 | Medin | 377/20 |
| 5,802,015 | A | * 9/1998 | Rothschild et al. | 368/10 |
| 5,835,553 | A | * 11/1998 | Suzuki | 377/25 |
| 6,337,836 | B1 | * 1/2002 | Eidelson | 368/10 |
| 6,557,760 | B2 | * 5/2003 | Goodwin, III | 235/383 |
| 6,795,376 | B2 | * 9/2004 | Quine | 368/10 |

* cited by examiner

*Primary Examiner*—Hung Nguyen
(74) *Attorney, Agent, or Firm*—Brooks, Cameron & Huebsch, PLLC

(57) ABSTRACT

An electronic assembly may be contained in a label that performs time-temperature integration (TTI) and indicates that time and/or temperature levels have been reached that may compromise the quality, shelf life, or safety of the item to which the label is affixed. The label may be used on a wide variety of objects that require careful handling in terms of temperature and/or time elapsed before use. The labeling system includes circuitry that measures and calculates, and indicator(s) that signal that the time has come for discounted sale, and, later, that the time has come for disposal rather than sale.

8 Claims, 13 Drawing Sheets

US 7,248,147 B2

PERISHABLE PRODUCT ELECTRONIC LABEL INCLUDING TIME AND TEMPERATURE MEASUREMENT

RELATED APPLICATIONS

This application is a continuation-in-part of co-pending International application No. PCT/US2004/007101, filed Mar. 8, 2004, which is herein incorporated by reference in its entirety, and which claims priority to both U.S. application Ser. No. 10/688,798, filed Oct. 17, 2003, and No. 60/453,354, filed Mar. 7, 2003; the present application is also a continuation-in-part of U.S. application Ser. No. 10/688,798, filed Oct. 17, 2003, now U.S. Pat. No. 7,057,495, which is herein incorporated by reference in its entirety, and which claims priority to U.S. Provisional Applications No. 60/453,354, filed Mar. 7, 2003, and No. 60/419,695, filed Oct. 17, 2002, both of which provisional applications are also herein incorporated by reference in their entirety.

BACKGROUND OF THE INVENTION

Embodiments of the present invention relate generally to methods and apparatus for detection of the conditions of spoilage of perishable merchandise. More particularly, although not exclusively, these embodiments are concerned with the detection of spoilage in chilled foodstuffs, such as meats.

The monitoring and control of the condition of fresh foodstuffs, which have been given enhanced, but not indefinite, shelf life by chilling and refrigerated storage, poses a major problem in society. Thus the consumer demands fresh food, conveniently packaged, and with all-the-year round availability in shops and supermarkets, while at the same time expecting that there is no danger of spoilage leading to impaired looks or flavor, or, more importantly, health risk in the purchased foods.

Oxidation and degradation by endogenous enzymes and bacterial growth processes involving the metabolism of a wide range of food constituents, including carbohydrates and amino acids, can all contribute to losses in sensory and/or hygienic qualities of foods and their ultimate rejection by the consumer. The relative importance of these various spoilage processes may vary from product to product, with conditions of transportation and storage, with intended use etc., but the consequences of bacterial growth are commonly an important contributory factor. This is especially the case for chilled-fresh foods such as meats.

RELATED ART

In reviewing the body of patents and commercial products, the inventors have found only chemical and visual means for monitoring the conditions of spoilage and means for monitoring only the passage of time. None of the prior art known to the inventors revealed a similar method of providing the functionality of the present invention, and none incorporate a means whereby electronic and algorithmic apparatus and methods are used to indicate the spoilage of perishable merchandise. The present invention utilizes electronic means to accomplish timing, and preferably not a chemical means.

SUMMARY OF THE INVENTION

The invention comprises, in a label, packaging, or packaging material for perishable items, an improvement comprising an electronic circuit including means for performing time-temperature integration (TTI) and means for indicating that time and/or temperature levels have been reached that may compromise the quality or shelf life of the item to which the label is affixed. The label may be used on a wide variety of objects that require careful handling in terms of temperature and/or time elapsed before use. This may include fresh or frozen foods, meats, or even drugs, blood, and organs for organ transplant. Preferably for food items, the labeling system includes circuitry that measures and calculates, and indicator(s) that signal that the time has come for discounted sale, and, later, that the time has come for disposal rather than sale. Optionally, the circuitry may include means, such as an "over-temperature alarm" system, to measure, calculate, and indicate when a one-time temperature violation has occurred that is of such a magnitude that the item is immediately considered compromised or spoiled.

As an introduction to the problems solved by the present invention, consider the supply chain for the perishable food products industry from the point of preparation and packaging through distribution into retail locations to the point of purchase at the cash register. Along the supply chain, perishable food products are handled through various temperature environments and over varying amounts of transportation, storage and shelf time. The spoilage of perishable food products can occur prior to purchase due to a variety of handling factors, where the temperature of these perishable food products may become compromised and/or elapsed time from packing to point of purchase may exceed safe limits.

There exists a need for a means whereby spoilage information can be conveyed to shippers, warehousers, handlers, retailers and consumers of perishable products, so that informed decisions can be made regarding the freshness of products in the supply chain. The present invention provides such a means of detecting spoilage through incorporation of one or several electronic timers and/or one or several temperature sensing and TTI calculation means into a portable, disposable label or similar package type, suitable to particular product applications.

In alternate embodiments, there can be simpler or more complex calculations for determining spoilage and/or indicating percentages, for example, to provide advance warnings. Spoilage determination in different embodiments may be made strictly on a timer-only basis, or may be made using the TTI technique. For instances of the present invention where alternate timer-only vs. TTI capabilities are desired, mode selection input pins can be incorporated into the electronic timing and control integrated circuit. The indication of predetermined limits being exceeded can be accomplished via a visual means, such as by utilizing LEDs or Liquid Crystal Displays (LCDs) or by audio means, such as by utilizing a piezoelectric sound element.

Certain embodiments of the present application may take the form of, for example, a label, a package, or packaging material. The label, package or packaging material may incorporate the electronic assemblies of the present application, which will be described herein below.

In one embodiment, the label is preferably flexible and disposable. In certain embodiments, the label may be powered by a small battery. The label may include a label cover/casing that is typically attached to the outer surface of the perishable product packaging using appropriate adhesives, or it may be placed in a visible pouch or attached by some other means to the target product to be monitored.

Printed graphics on the top surface convey retail information such as unit pricing, weight, trademarks, logos, or other information.

The package and packaging material embodiments may incorporate the electronic assemblies directly into the package or packaging materials of the target product. These packages and packaging materials may comprise any suitable materials, including, for example, paper, cardboard, and plastic.

By the term package is meant a container of the target product. In one embodiment, the package is a plastic container with an indented area where an electronics assembly for monitoring and alerting persons to the spoilage of perishable products, as described in the present application, may be directly mounted. The electronics assembly may also comprise one or more sensors for sensing environmental conditions of the container. In certain embodiments the sensors may be mounted in various locations around the container.

In yet another embodiment, the electronics assembly may be bonded onto, or integrated into, the package. For example, the electronics assembly may be bonded onto a cardboard box, or other type of container, during box manufacture.

Examples of packaging materials include filler foam, plastic shrink wrap, Styrofoam peanuts, and tape for sealing the package. As with the packaging examples above, the electronics assemblies of the present application may be incorporated into, or attached to, one or more of the various packaging materials used in packaging the produce. For example, electronics assemblies may be incorporated into foam inserts used to pack and protect products.

A beneficial aspect of the present invention is that all of the circuitry may be incorporated into a custom integrated circuit, leading to a smaller, simpler circuit arrangement that requires less energy to operate than would otherwise be achievable. Reduced energy consumption allows reduced battery size, cost and weight.

An aspect of the present invention may involve a method of performing time-temperature integration entirely within an integrated circuit. Embodiments of such a method may comprise providing a temperature-variable oscillator or time-base, counting cycles of said oscillator within a logic circuit to determine when one or more preset total cycle counts is/are reached, and signaling when said total cycle count(s) is/are reached. Such preset total cycle counts may be fixed in the circuit, or may be selected from a set of constants via I/O control, or may be adjusted at time of manufacture via program control. For instance, there may be a preset number of counts that signify 75% of life of product has occurred vs. a second, higher preset number of counts to indicate that 100% of life (spoilage) has occurred. Or, for embodiments of the method employed in machinery or equipment operation, there may be preset numbers of counts that indicate different levels of hazardous conditions of prolonged high temperature operation.

Therefore, the improvements made possible in the present invention are numerous, and are each of high value in terms of contribution to the invention's benefits, features and usefulness. The full human benefit of this invention is not immediately fathomable, but industries that can apply it include shipping and product distribution, medicine, fresh baking and raw food products, meat, dairy products, poultry, fish and fresh produce. In each of these industries, human health and economic benefits can be realized directly through the prevention of product spoilage. As well, industries that require machinery or equipment to remain within certain temperature limits can benefit from the invented apparatus and methods.

In certain embodiments, the time-temperature monitoring of the present invention may be accomplished while concurrently sensing other environmental conditions through incorporation of one or more extra sensors within the same device. For example, a humidity sensor can detect harmful levels of humidity in packaging that contains fresh produce, whereby an alarm condition can be enabled to warn a retailer or a customer. Other such sensors may detect physical orientation or tilt, acceleration or shock, barometric pressure or altitude. A sensor that detects the presence of gaseous or liquid signature molecular compounds generated by spoiled food can also be incorporated in a similar manner.

The present invention may also contain a real-time clock, memory for storing measured data, and/or may also exchange data via hardwired connection, infrared, inductive coupling, or via radio frequency modulation. These sensing, memory and communicative circuit elements may be constructed from readily available components from companies such as Dallas Semiconductor/Maxim, National Semiconductor, Sensirion and Jaztek.

The circuits may be built as collections of surface mounted components on a printed circuit board, or also may be integrated into circuits on silicon substrates. Circuit component systems may be connected with a serial or parallel connection, or as part of a bus architecture. The fantastic advantages of miniaturization can be realized using current semiconductor design, layout and fabrication technologies, whereby the electronic circuitry of the present invention, in all of its embodiments may be constructed on a silicon or other suitable substrate.

One embodiment of the present application is related to an electronics assembly for monitoring and alerting persons to the spoilage of perishable products, comprising one or more oscillators or time-bases, one or more batteries or energy cells, an electronic monitoring and/or timing circuit, and one or more indicators. Each of said oscillators or time-bases and each of said monitoring and/or timing circuits is powered by said one or more batteries or energy cells, and each of said indicators is connected to said electronic monitoring and/or timing circuit, so that said assembly functions to perform time and/or time-temperature measurement and to provide alarm status at said one or more indicators when calculated alarm event times occur.

In another embodiment of the present application, the electronics assembly is incorporated into a label.

In another embodiment of the present application, the oscillators or time-bases of the electronics assembly are temperature variable and wherein the assembly is adapted to perform time-temperature measurement and to provide alarm status at said one or more indicators when calculated alarm event times occur.

In another embodiment of the present application, the oscillators or time-bases of the electronics assembly are fixed-frequency.

In another embodiment of the present application, the oscillators or time-bases of the electronics assembly are able to be calibrated at the point of manufacturing. In certain embodiments, the calibration may be achieved with a memory register and capacitor summing technique.

In another embodiment of the present application, the oscillators or time-bases of the electronics assembly may be chosen from ring-type resonant circuits, silicon-based resonant circuits and resonant crystals.

In another embodiment of the present application, the electronics assembly may comprise one or more audible alarm devices.

In another embodiment of the present application, the electronic monitoring and/or timing circuit of the electronics assembly is capable of measuring temperature.

In another embodiment of the present application, the electronic monitoring and/or timing circuit of the electronics assembly contains a microcontroller and stored program codes. In one embodiment of the present application, the electronics assembly may further comprise one or more integrated circuit devices that communicate with the microcontroller via one or two-way serial interface. The integrated circuit devices may be, for example, a real-time clock.

In one embodiment, the electronics assembly further comprises circuitry to facilitate inter- communication of data with said microcontroller via one or two-way serial interface. In one embodiment, the circuitry facilitates wireless radio frequency communication of data. In yet another embodiment, the circuitry facilitates wireless infrared communication of data.

In another embodiment of the present application, the electronics assembly may comprise an environmental sensor that is a temperature sensor.

In another embodiment of the present application, the electronics assembly may comprise one or more environmental sensors, and an interface to said one or more environmental sensors. In one embodiment, the environmental sensors are chosen from a humidity sensor, a sensor that detects physical orientation, an acceleration sensor, a sensor of atmospheric pressure, a sensor of molecular compounds, and combinations thereof.

In one embodiment of the present application, the electronic monitoring and/or timing circuit of the electronics assembly is incorporated into one or more integrated circuits.

In one embodiment of the present application, the one or more indicators of the electronics assembly may be visual indicators chosen from LEDs and LCDs.

In yet another embodiment, the present application is directed to a label for monitoring and alerting persons to the spoilage of perishable products, the label comprising an electronics assembly and an outer label cover. The electronics assembly may be chosen from any of the electronics assemblies described herein. In one embodiment, the electronic assembly comprises one or more oscillators or time-bases, one or more temperature sensing elements, one or more batteries or energy cells, an electronic monitoring and/or timing circuit, and one or more indicators. Each of said oscillators or time-bases and each of said monitoring and/or timing circuits is powered by said one or more batteries or energy cells, and each of said indicators is connected to said electronic timing circuit, so that said assembly functions to perform time measurement and to provide alarm status at said one or more indicators when calculated alarm event times occur.

Yet another embodiment of the present application is directed to a time-temperature integrator comprising an electronic assembly. The electronic assembly may be chosen from any of the electronics assemblies described herein. For example, the electronic assembly may comprise one or more oscillators or time-bases, one or more temperature sensing elements, one or more batteries or energy cells, an electronic monitoring and/or timing circuit, and one or more indicators. Each of the oscillators or time-bases and each of the monitoring and/or timing circuits is powered by said one or more batteries or energy cells, and each of said indicators is connected to said electronic monitoring and/or timing circuit, so that said assembly functions to perform time and/or time- temperature measurement and to provide alarm status at said one or more indicators when calculated event times occur.

In one embodiment, the time-temperature measurement of the electronic assembly is performed using the oscillator or time-base, the oscillator or time-base being temperature variable.

In one embodiment, the electronic monitoring and/or timing circuit of the time-temperature integrator is capable of measuring temperature.

In another embodiment, the electronic monitoring and/or timing circuit of the time-temperature integrator contains a microcontroller and stored program codes.

Yet another embodiment of the present application is directed to a method of performing time-temperature integration entirely within an integrated circuit. The method comprises providing a temperature-variable oscillator or time-base; counting cycles of said oscillator within a logic circuit to determine when one or more preset total cycle counts is/are reached; and signaling when said total cycle count (s) is/are reached.

These aspects, associated embodiments, advantages and features of the present invention will be set forth in part in the description, and in part will come to those skilled in the art by reference to the following Detailed Description of the invention and referenced Drawings, or by practice of the invention.

DETAILED DESCRIPTION OF THE INVENTION

Referring to the Figures, there are shown several, but not the only, embodiments of the invention. A label according to one embodiment of the invention contains not only printed information, but also an electronic circuit and indicators for the purpose of signaling to status conditions to those within view.

Figure 1:
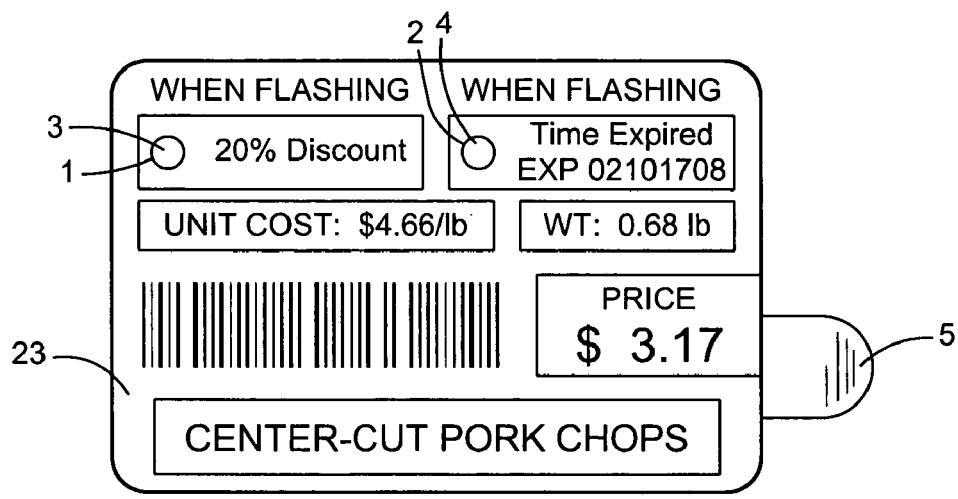
FIG. 1 is a top view of one embodiment of the invention.

FIG. 1 is a top view of one embodiment of the invention, which is a generally flat label for application to a product package (not shown). Surface 23 is intended to be both pre- and post-printed with text and graphics, as required for essential product information, such as a description of the contents, pricing, bar-coding and other important information. Surface 23 is composed of paper, plastic or other printable material, and has openings, 1 and 2, through which light emitting diodes (LEDs) mounted underneath the surface can flash to alert those within view of the occurrence of a particular status condition. In the present invention, a status condition would typically be one of a plurality of possible status conditions.

In alternate embodiments there may be a fewer or greater number of such LED's and openings, and there may be diffusion and/or color filters laminated to the backside of said openings. Activation tab 5 is the tip of a plastic insulator strip that, when pulled, comes out from between laminated layers of the label, thereby allowing a battery contact to the circuit to be made.

Figure 2:
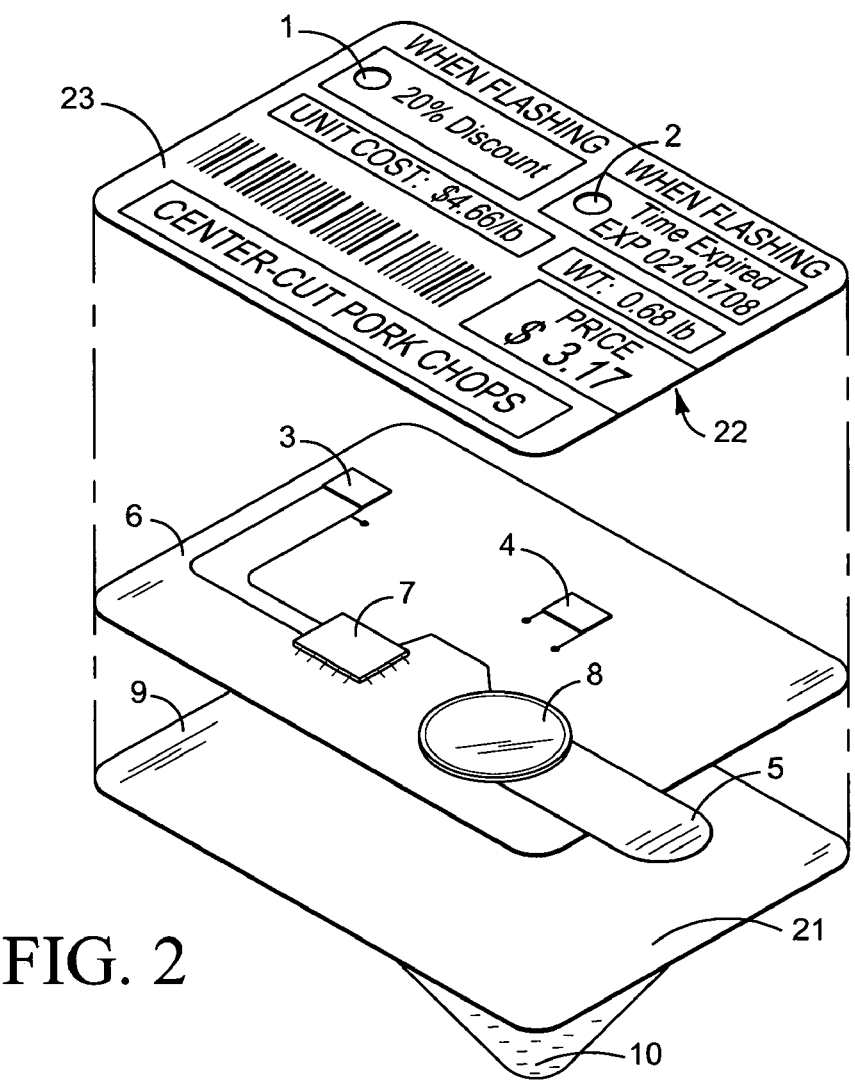
FIG. 2 is an isometric view of the componentry of the preferred embodiment of the invention, shown with layers separated for identification.

FIG. 2 is an isometric view of the componentry of the preferred embodiment of the invention, embodied in a perishable product label, shown with layers separated for identification. Top printable cover 23 is shown, with its openings 1 and 2. Contact adhesive 22 adheres the cover 23 to printed circuit board 6. Similarly, adhesive surface 21 on bottom layer 9 adheres to the bottom of printed circuit board 6. Removable cover strip 10 is shown partially peeled away from bottom layer 9. Circuit board 6 is shown with an integrated circuit 7, two LED's 3 and 4, battery 8, and activation strip 5. What is not illustrated in FIG. 2 is a way in which the thicker components such as integrated circuit 7 and battery 8 can be prevented from protruding as unsightly bumps on the top or bottom surface of the label. A solution can be affected by inserting a die-cut foam adhesive material, such as 3M 4432 or 4416 double-sided adhesive foam tape as an alternative to adhesives 21 and/or 22. By die-cutting "wells" through the foam material to accommodate the thicker components, the entire label ends up having a more consistent thickness across the top and bottom surfaces.

Figure 3A:
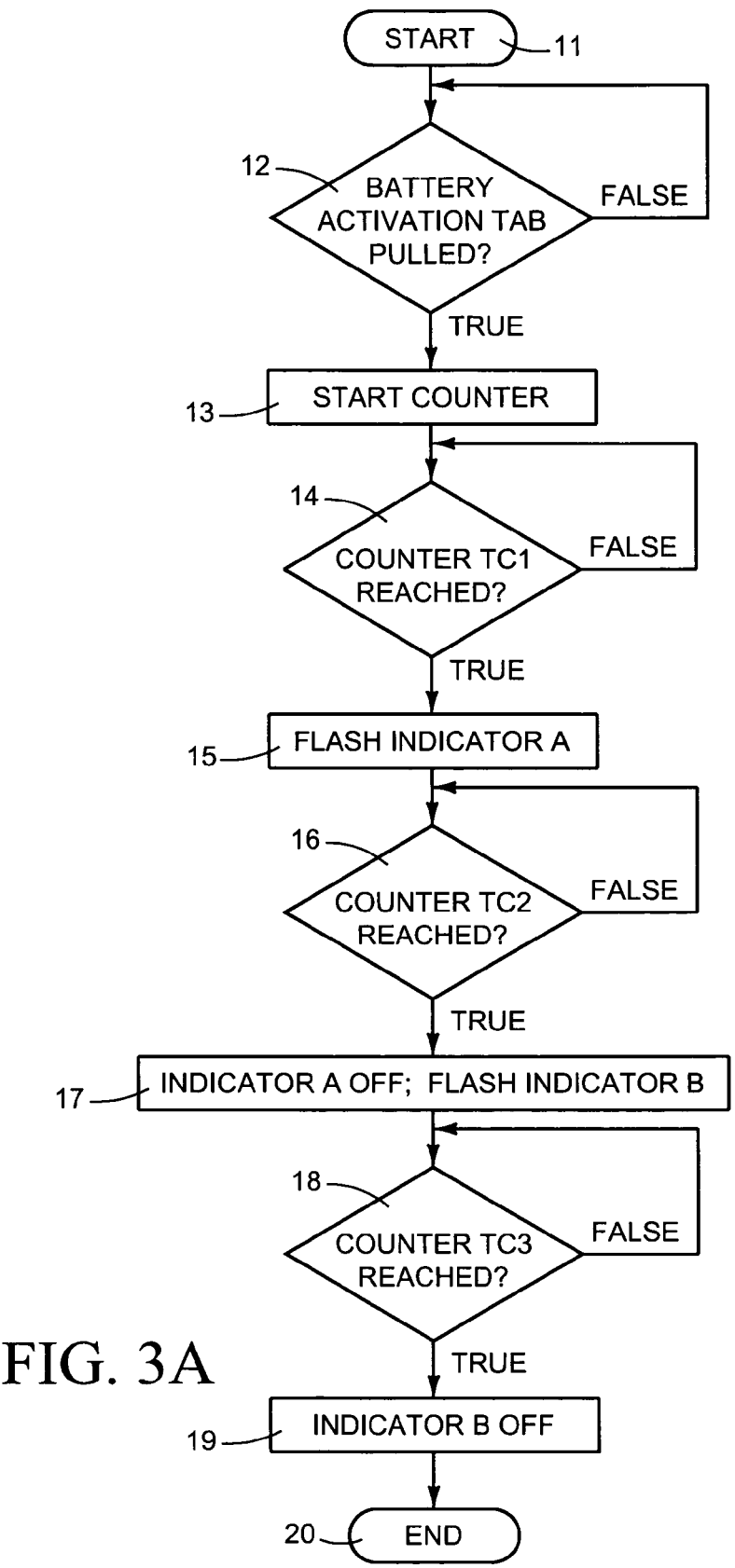
FIG. 3a is a flowchart of the operation of the preferred embodiment of the invention.

FIG. 3a is a flowchart of the operation of the preferred embodiment of the invention that operates using a time-temperature integration calculation method. At the Start 11 of the program flowchart, no action occurs until the battery activation tab is pulled at step 12, which causes the counter to start counting at step 13. Once the counter reaches terminal count TC1 at condition 14, then indicator A begins flashing at 1 Hz at step 15. It will continue flashing until the counter reaches terminal count 2 at condition 16. Once terminal count TC2 is reached, then indicator A will stop flashing, and indicator B will begin flashing 17. Indicator B will then continue flashing until the terminal count TC3 is reached 18, 19 and the program stops at flowchart step 20.

Figure 3B:
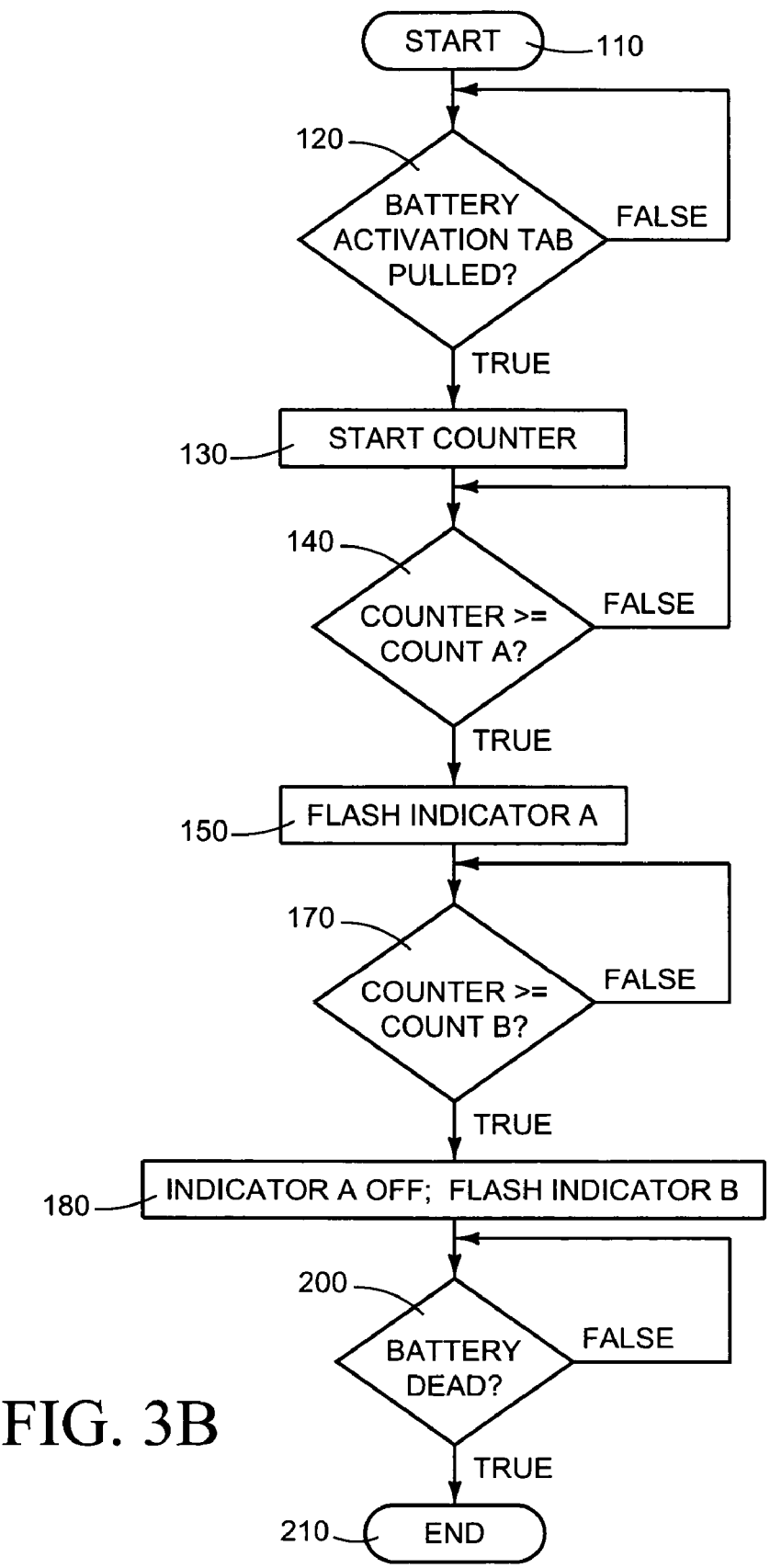
FIG. 3b is a flowchart of the operation of an alternate embodiment of the invention.

FIG. 3b is a flowchart of the operation of an alternate embodiment of the invention that operates on a timer-only basis. At the start 110 of the program flowchart, no action occurs until the battery activation tab is pulled at step 120, which causes the counter to start counting at step 130. Once the counter reaches its setpoint at condition 140, then indicator A begins flashing at 1 Hz at step 150. It will continue flashing until the counter reaches limit B at condition 170. Once limit B is reached, then indicator A will stop flashing, and indicator B will begin flashing at step 180. Indicator B will then continue flashing until the battery runs out of energy at step 200 and the program stops at flowchart step 210. The duty cycle or on-time of the LED's can be varied, and shortening the LED duty cycle to fractions of a percent can extend battery life. The trade-off between battery life and light amplitude is subjective and dependent upon the type of LED and the type of battery used in the circuit.

Certainly, it is within the scope of this invention to include other program flow steps, such that the flashing of LED's occurs in different sequences. The duty cycle or on-time of the LED's can be varied, and shortening the LED duty cycle can extend battery life. Other indicator types, such as LCD types, may be substituted for LEDs. Audible piezoelectric beeper elements may be incorporated. Multiple timers and multiple temperature sensors may be monitored in one label according to multiple embodiments of the present invention.

To realize lower energy requirement in the present invention, the persistence of vision property of the eye can be exploited by pulsing the LED on and off at a rate faster than approximately 25 Hz, resulting in lower total current drain for the same apparent brightness, as opposed to when holding an LED On continually for the same desired viewing period. The trade-off between battery life and light amplitude is also subjective and dependent upon the, current limiting properties of the circuit and the type of LED and battery components that are used in the circuit.

Figure 4:
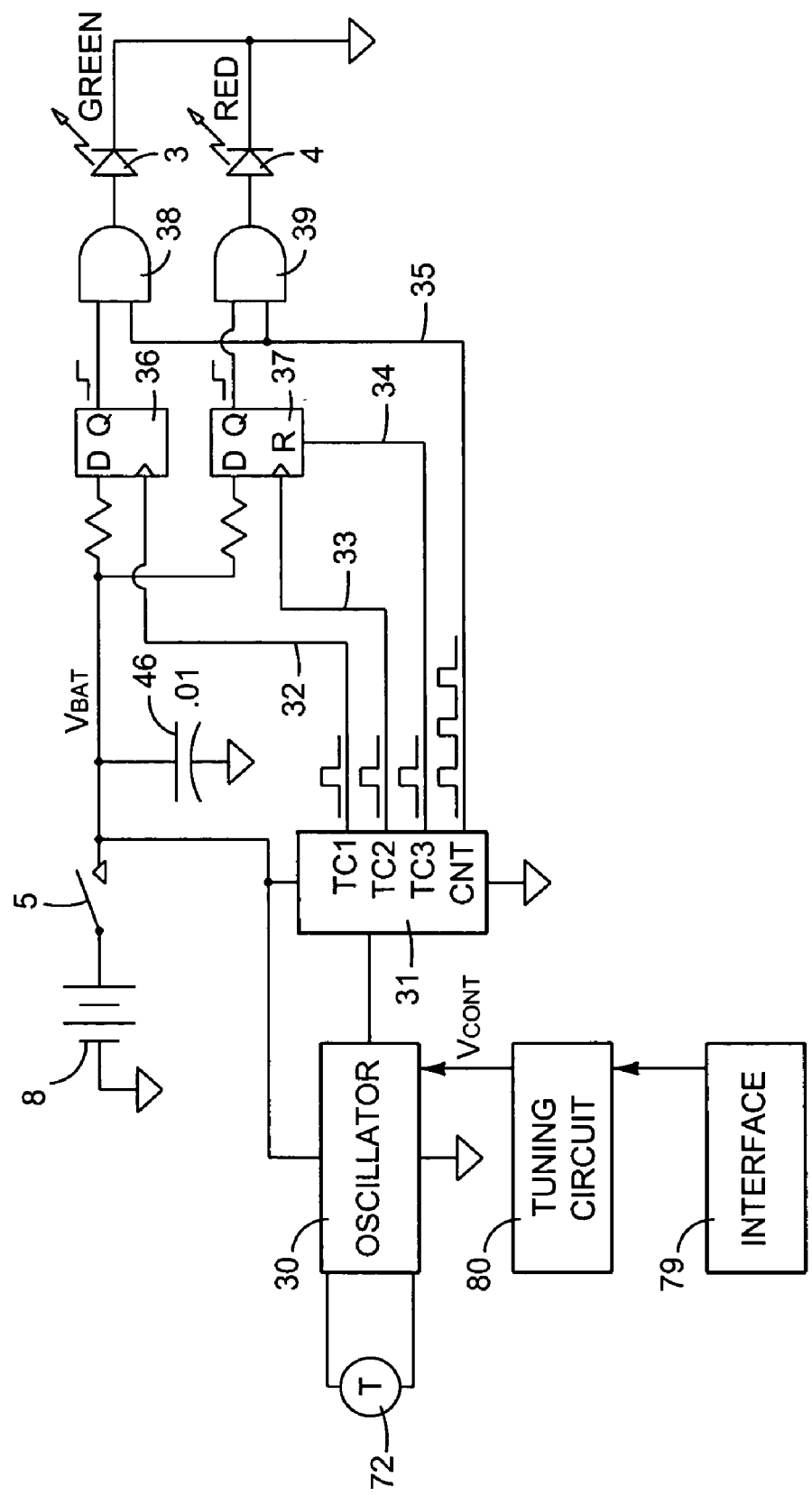
FIG. 4 is a schematic diagram of the circuit of the preferred embodiment of the invention.

FIG. 4 is a schematic diagram of the circuit of the preferred embodiment of the invention. It shows battery 8 connected to activation switch 5, which supplies the Vbat voltage to the circuit. Oscillator 30 is astable, free-running and provides a clock signal to counter 31. The logic level outputs of counter 31 include terminal counts that occur at specified Terminal Count 1, TC1 (signal 32), Terminal Count 2, TC2 (signal 33), and Terminal Count 3, TC3 (signal 34), as well as a low duty cycle, 1 Hz clock Count, CNT (signal 35). The function of the two "D" type latches 36 and 37 is to register the terminal counts of TC1 (signal 32) and TC2 (signal 33), such that LED's 3 and 4 are enabled to flash.

AND Gates 38 and 39 enable and disable flashing, according to what terminal counts have been registered. Note that TC2 (signal 33) disables green LED 3, and likewise TC3 (signal 34) disables red LED 4. Therefore until TC1 is reached, no indicator is flashing. Between the occurrence of TC1 and TC2, the green LED 3 is flashing, and between TC2 and TC3 the red LED 4 is flashing. In this preferred embodiment, after TC3 occurs, no LED is flashing. However, the red LED could flash until the end of battery life as a close alternate.

It is an object of the present invention to control the oscillator as a means of setting its base frequency through the function of tuning circuit 80. The interface 79 can be used to erase and write new values to tuning circuit 80. Also, the oscillator can be tuned in frequency relative to the local temperature through the function of temperature sensor 72. Detail of these control means is further described below.

Figure 5:
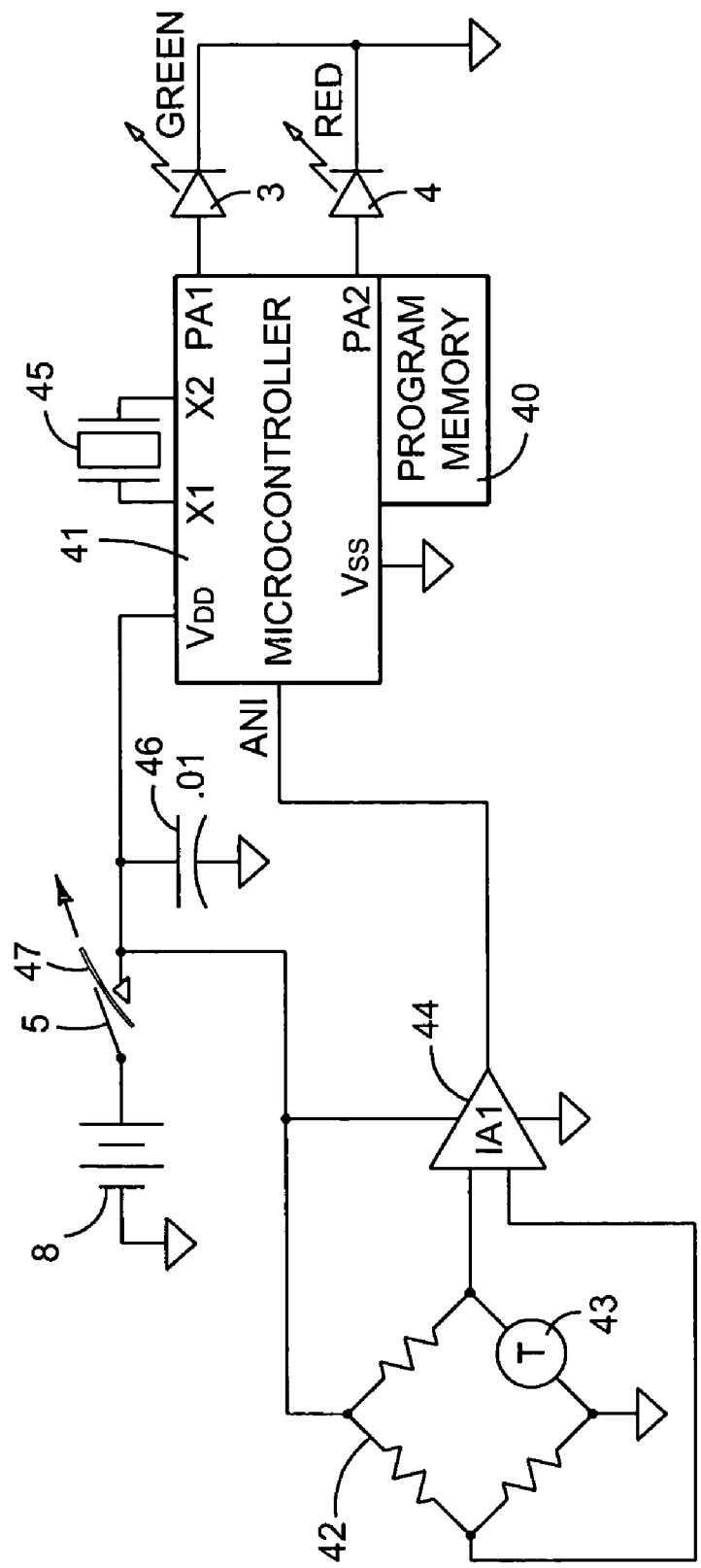
FIG. 5 is a schematic diagram of the circuit of an alternate embodiment of the invention.

FIG. 5 is a schematic diagram of the circuit of an alternate embodiment of the invention. Upon closure of activation switch 5 by way of removal of insulating pull-strip 47, the battery 8 supplies power, filtered by bypass capacitor 46 to microcontroller 41. Microcontroller 41, upon power-up, executes the program stored in program memory 40. Its instruction execution rate can be set by way of crystal 45, or the crystal can be eliminated through use of an internal RC oscillator, such as can be found in many modern microcontroller product offerings by companies such as MicroChip, Philips, Hitachi and others. The green and red LED's 3 and 4, are driven by output port pins on microcontroller 41.

As for temperature sensing means, thermistor sensor bridge 43 is amplified by instrument amplifier 44, from which the output signal is fed into the analog input of microcontroller 41. Using the elements described, changes in temperature affect the timing of events. Numerous temperature processing algorithms can be implemented and stored in program memory 40 for execution by microcontroller 41.

The circuit of FIG. 5, through execution of the algorithm stored in program memory 40, can accomplish similar functions as is accomplished by discrete logic, such as the circuit of FIG. 4, and according to the flowchart of FIG. 3. The circuit of FIG. 5 can also accomplish temperature compensation of the clock frequency, the emulation of tuning circuit 80 or any other appropriate algorithm, as required for alternate modes of operation. As will be described below, there is a specific formula that closely models the growth of pathogens that cause spoilage in perishable products.

Figure 6:
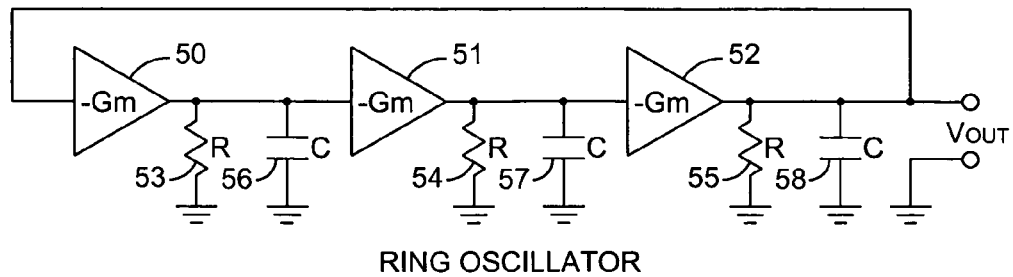
FIG. 6 is a schematic diagram of a single-ended, three-stage ring oscillator circuit.

The ring oscillator as shown in FIG. 6 exemplifies a linear electronic circuit that typically contains three stages of single-ended phase shifters 50, 51 and 52, that are linked in a closed loop configuration. Each of these stages shift the phase of the signal by 120 degrees. The phase delay of each stage is affected through circuit loading by resistors 53, 54 and 55 and capacitors 56, 57 and 58 in each respective stage.

Figure 7:
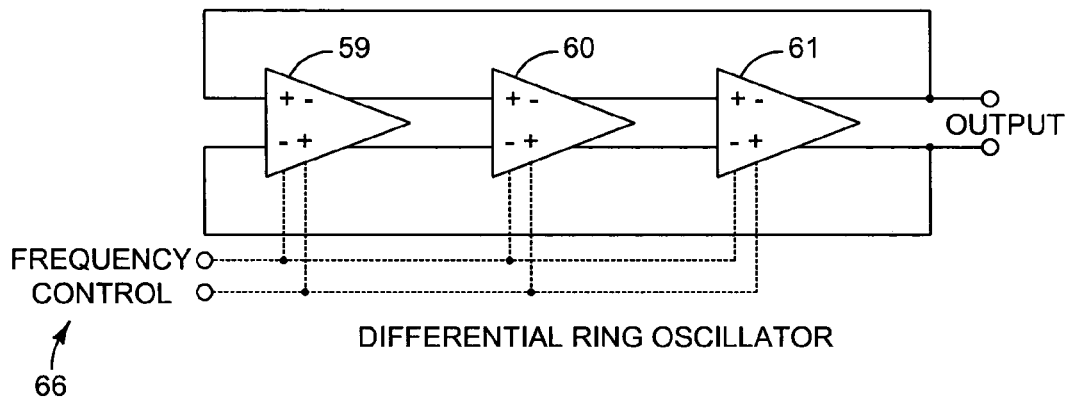
FIG. 7 is a schematic diagram of a differential, three-stage ring oscillator circuit.

A preferred type of ring oscillator is also three stage, but features differential phase shifting circuitry, as shown in FIG. 7. Each phase shifting amplifier 59, 60 and 61 has cross-connected positive and negative inputs, and similar feedback to the circuit depicted in FIG. 6. Frequency control input 66 can be adjusted, allowing a linear adjustment of phase in all three stages in parallel. Frequency shifting will occur proportional to the differential voltage level at the frequency control input 66. This renders this type of oscillator a Voltage Controlled Oscillator (VCO).

Figure 8:
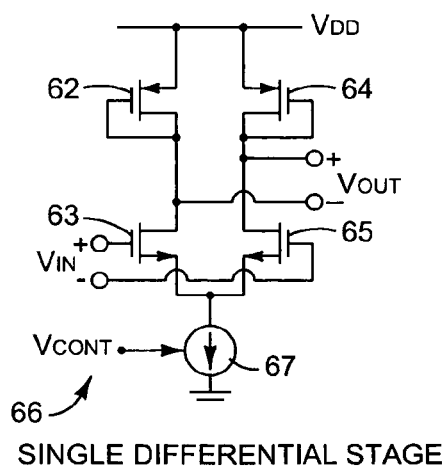
FIG. 8 is a schematic diagram of a single stage of the differential ring oscillator circuit of FIG. 7.

In the schematic diagram of FIG. 8, a single differential stage of such a VCO is shown, which includes two complimentary CMOS driver transistor pairs, 62, 63 and 64, 65. In this circuit, the frequency control input (Vcont) 66 controls a current limiting circuit 67, which limits the tail current of the stage proportional to the level of Vcont signal 66.

It is an object of the present invention to decrease timeout periods, (of the terminal counts of counter 31 in FIG. 4), in relation to the rate of spoilage of a product as temperature increases. To mirror the growth of pathogens, the oscillator frequency of the preferred embodiment varies according to $[f_{osc}=ne^{-(E_a/RT)}]$. This models the rate of reaction or Arrhenius Energy, where n is a constant, Ea is the activation energy, R is the universal gas constant, and T is the temperature in degrees Kelvin. Varying the timing of the present invention to achieve the desired equation with differing values of n can either be accomplished a) using timing algorithms and/or tables contained in program memory 40 and executed by microcontroller 41 of the circuit depicted in FIG. 5, or b) by varying the clock frequency over temperature by varying the control voltage of a VCO, thereby affecting the rate at which terminal counts are reached, in either case.

Figure 9:
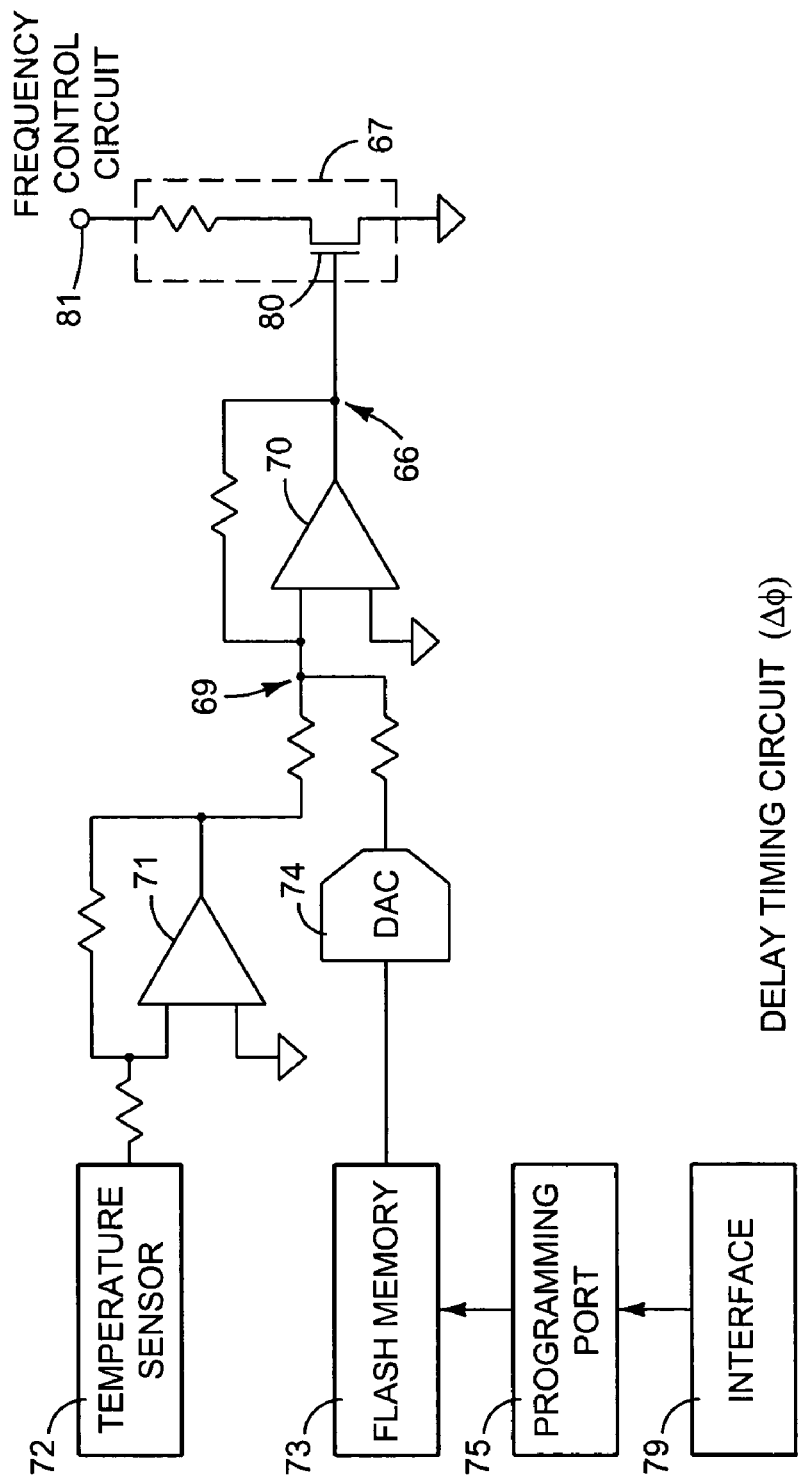
FIG. 9 is a schematic diagram of a delay tuning circuit utilizing temperature sensing means.

FIG. 9 depicts a schematic of a delay tuning circuit suitable for control of the VCO of the preferred embodiment of the present invention. The current limiting circuit 67 is again depicted in FIG. 9, where MOS transistor 80 regulates the current and phase of each ring oscillator stage. The frequency control 66 of each stage can be connected in parallel to current node 81, which will sink the oscillator tail current according to the output of amplifier 70. Note that node 66 is shown as the output of amplifier 70. This node is suitable for connection to Vcont in FIG. 8.

Node 69 is a summing node that sums the signals from amplifier 71 and digital to analog converter (DAC) 71. Temperature sensor 72 affects the output voltage of amplifier 71. FLASH memory 73 can be overwritten by way of programming port 75 which can be connected to a programming device through interface 79. The memory 73 outputs a binary value to DAC 74, which in turn outputs a proportional analog signal level.

The function of the circuit depicted in FIG. 9 is twofold. First, temperature at sensor 72 proportionally changes the oscillator frequency by way of changing the tail current of each stage of the oscillator. Second, the FLASH memory register 73 provides a means to tune the frequency of the oscillator.

Figure 10:
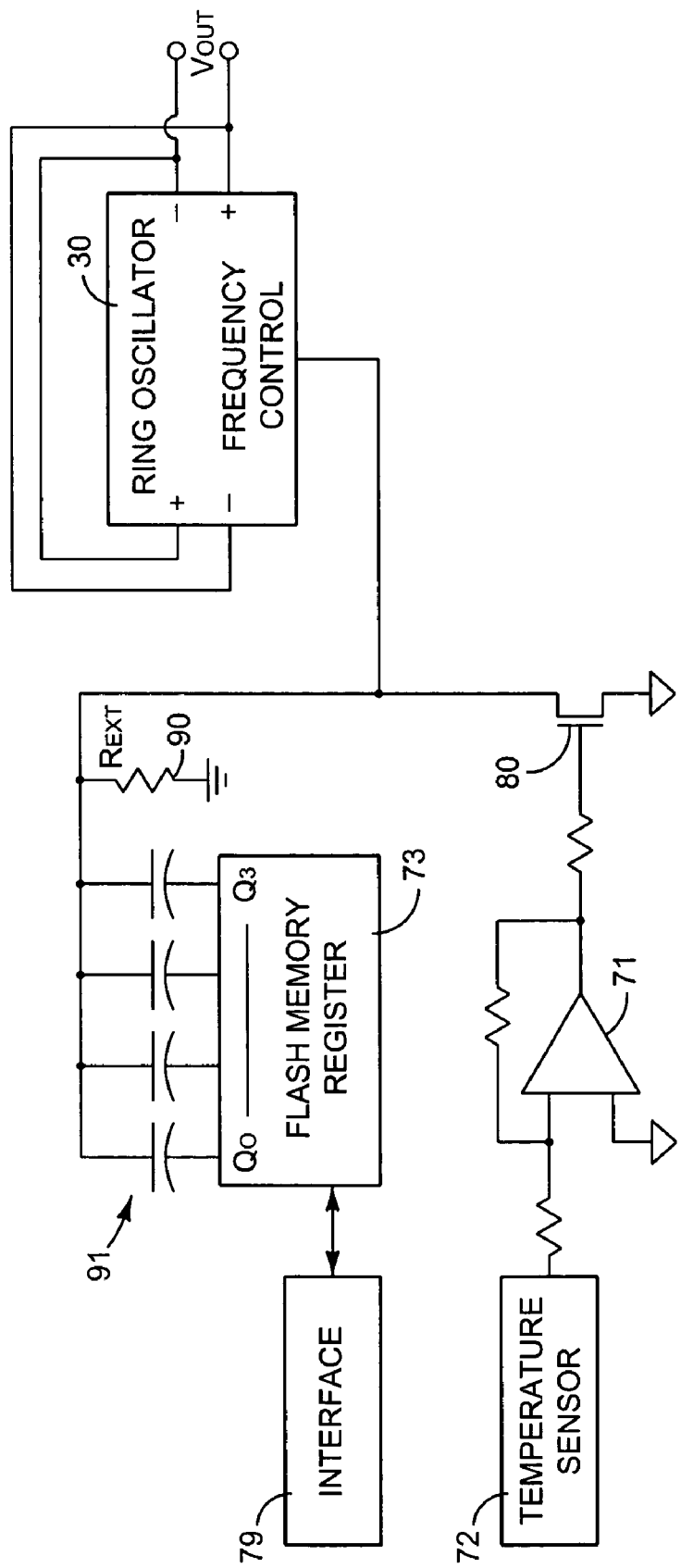
FIG. 10 is a schematic diagram of an alternate embodiment of a delay tuning circuit.

An alternate embodiment depicted in FIG. 10 provides a method of tuning the oscillator frequency. This circuit makes use of a FLASH memory register 73 to shift the polarity of a fixed set of capacitors 91, which in combination vary the capacitive coupling between frequency control signal 66 and circuit ground proportional to their sum capacitance, thereby varying the oscillator frequency to achieve a calibrated frequency at time of manufacture.

When the output of a typical signal line (Q0-3) of memory register 73 is in a high state, (logic level "1"), then the stored charge on its respective capacitor is lower than when compared to when it in the opposite, low state (logic level "0").

The sum capacitive charges of all capacitors 91 serve to increase/decrease the loading of the oscillator 30 by varying the tail current. Rext is another load setting component that is summed to the load at node 66, and is intended to provide a coarse setting of tail current in the circuit.

Also connected to frequency control signal 66 is CMOS transistor 80, which is driven to conduct load current, thereby varying the oscillator frequency. The temperature sensor 72 is amplified by amplifier stage 71, which drives CMOS transistor 80.

The foregoing description of the present invention is not intended to be exhaustive or to limit the invention to the precise forms disclosed. For example, the following elements can be modified to achieve the same invention: Different amplifier configurations can be substituted for amplifiers 70 and 71 in FIG. 9; Eliminating FLASH memory register 73, and instead directly driving I/O pins in order to directly tune the oscillator frequency can be practiced; The oscillator can be based upon, for example a crystal, can be silicon-based, or can be a ring-type oscillator, among numerous other basic types commonly known in the art; The temperature sensor can be implemented using various transforming functions to suit different rates of reaction in the target product.

With regard to the circuit of FIG. 5, microcontroller 41 can be incorporated into the circuitry of a custom integrated circuit as a core piece of functionality. This allows for size and cost reduction through reduction of substrate area, whereby only those features required to suit specific algorithmic and I/O requirements of the application are implemented into the design of such a circuit.

The temperature sensor can be implemented using other sensing technologies such as thermistor, RTD or semiconductor junction types; Various indicators may be used, such as LCD's, e-ink, or similar display product offerings. Many modifications and variations beyond the examples given will be apparent to practitioners skilled in this art.

Alternate embodiments of the present invention are directed to a time and temperature measurement and computation device, as described above and depicted in FIGS. 11 through 15, wherein the device is combined with various additional sensing, data memory storage, timing and communication peripheral circuitry.

Figure 11:
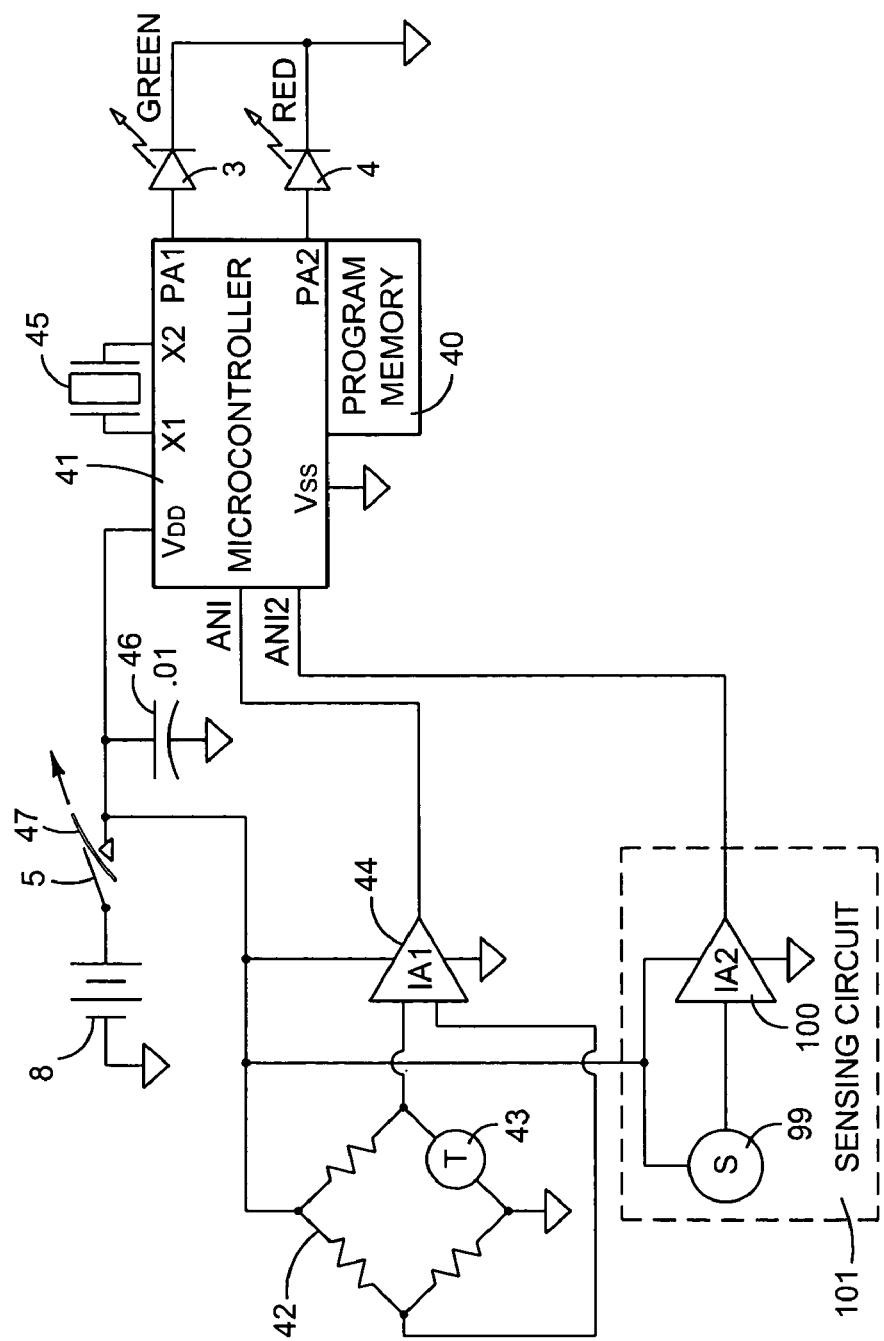
FIG. 11 is a schematic diagram of the circuit of an alternate embodiment of the invention that incorporates an extra sensing device.

The incorporation of an extra Sensing Circuit 101 comprising an analog sensor 99 and a second instrumentation amplifier 100 are shown in FIG. 11. The sensor signal is amplified by instrumentation amplifier 100, and the resultant signal is input to microcontroller analog input ANI2. The circuit of FIG. 11 can measure different environmental parameters, depending upon the type of sensor 99 that is used. Examples of sensing types are as follows:

| Sensor Type | Environmental Parameters |
|---|---|
| Humidity | Relative humidity |
| Orientation | Tilt |
| Acceleration | Shock and vibration |
| Molecular Composition | Antigen detection, Spoilage |
| Atmospheric Pressure | Altitude |

It is within the capability of microcontroller 41 to input more than one such sensor signal.

Figure 12:
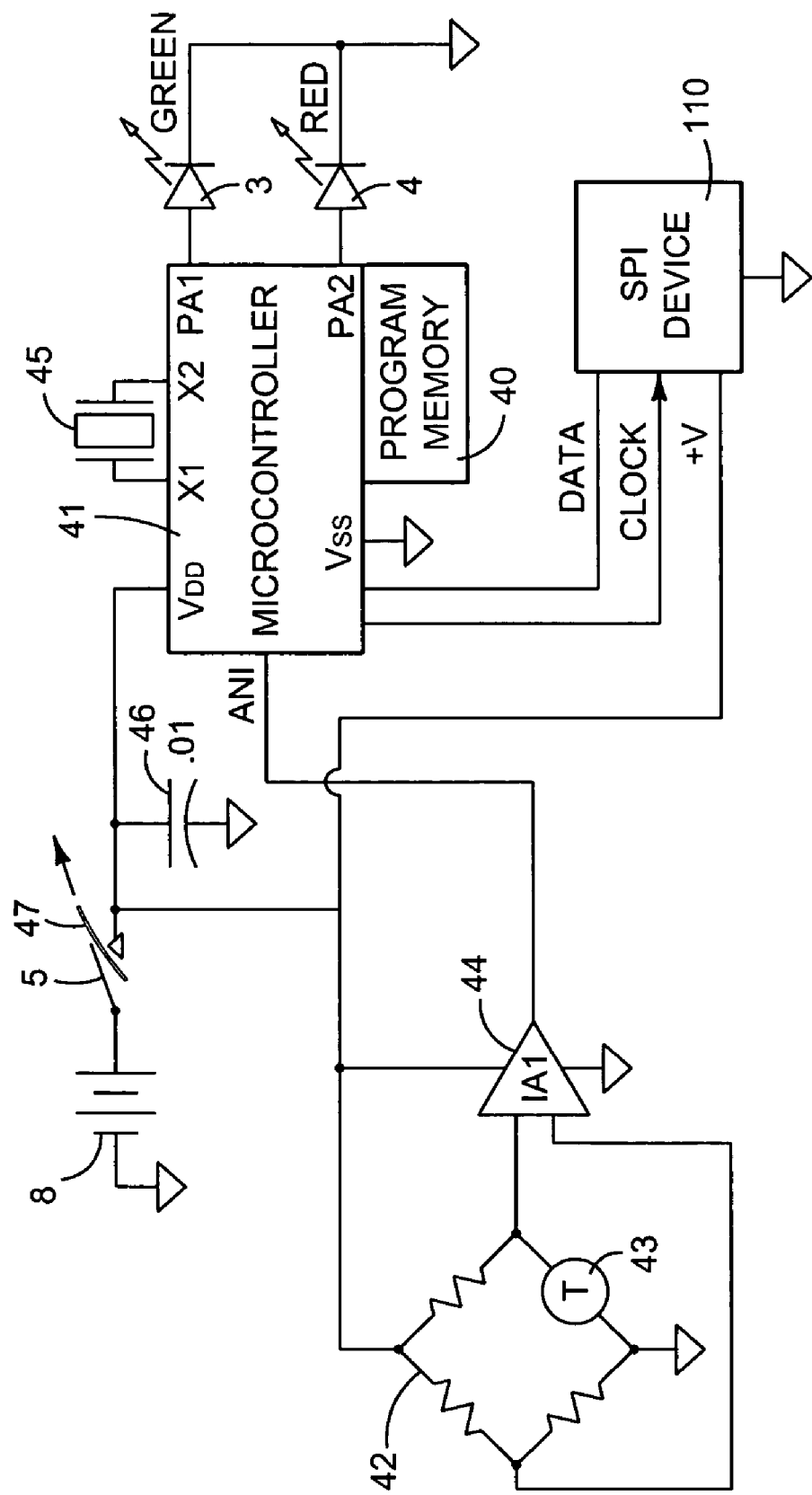
FIG. 12 is a schematic diagram of the circuit of an alternate embodiment of the invention that incorporates a serial peripheral device

The incorporation of a Serial Peripheral Interface (SPI) or other synchronous serial data exchange type of device 110 is shown in FIG. 12. Examples of device types are as follows:

| SPI Device Type | Usage |
|---|---|
| Real-Time Clock | Time stamping of data, communication |
| Flash Memory | Data storage |
| Humidity | Relative humidity |
| Orientation | Tilt |
| Molecular Composition | Antigen detection, Spoilage |
| Acceleration | Shock and vibration |
| Atmospheric Pressure | Altitude |

It is also within the capability of microcontroller 41 to interface with more than one of these devices. An asynchronous interface device that achieves identical functionality can be achieved by connecting only a signal lead and a ground connection. Such devices are available commercially available from companies such as Dallas Semiconductor or Analog Devices, Inc.

Figure 13:
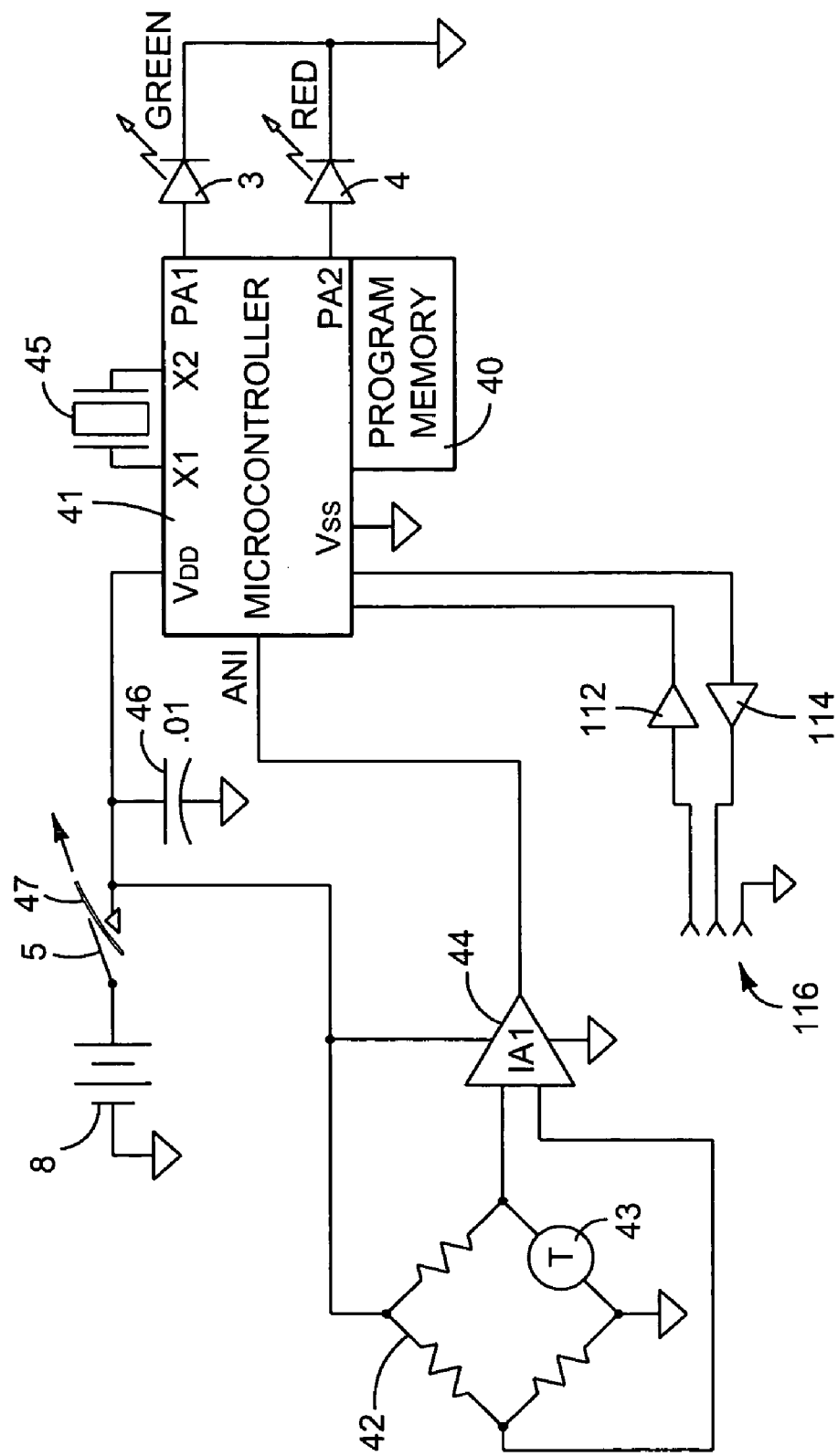
FIG. 13 is a schematic diagram of the circuit of an alternate embodiment of the invention that incorporates a hard-wired interface.

FIG. 13 depicts the addition of a simple hard-wired external data exchange interface that can be implemented using interface receiver 112 and interface driver 114. Either or both of these interface devices may be optionally incorporated into microcontroller 41.

Figure 14:
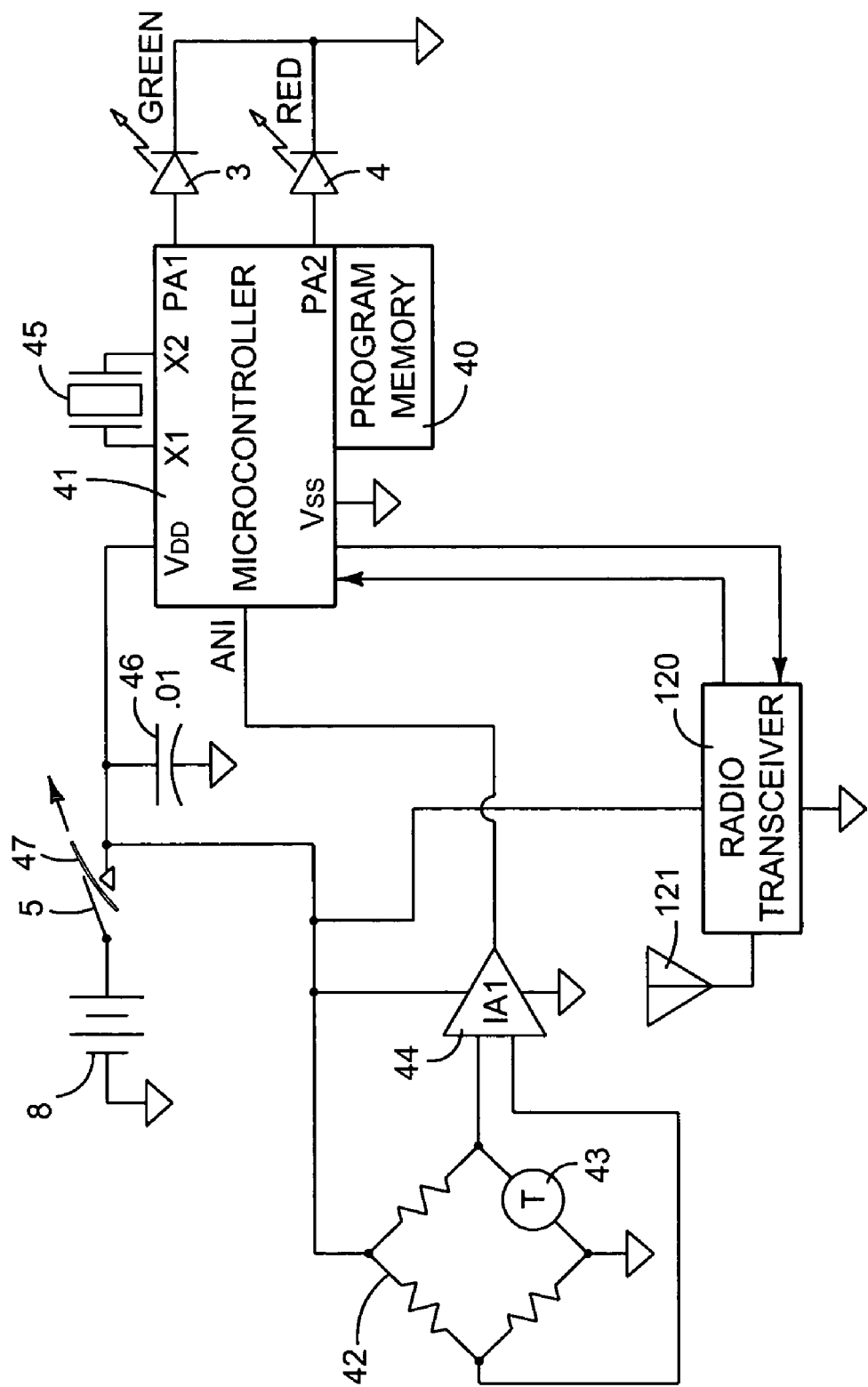
FIG. 14 is a schematic diagram of the circuit of an alternate embodiment of the invention that incorporates a radio frequency interface.

In FIG. 14, an embodiment is shown whereby external interface through wireless means is accomplished by way of radio transceiver 120 and antenna 121. It is also possible to incorporate one or both separate transmitter and receiver elements as alternates to transceiver 120, so as to provide one or two-way data communication.

Figure 15:
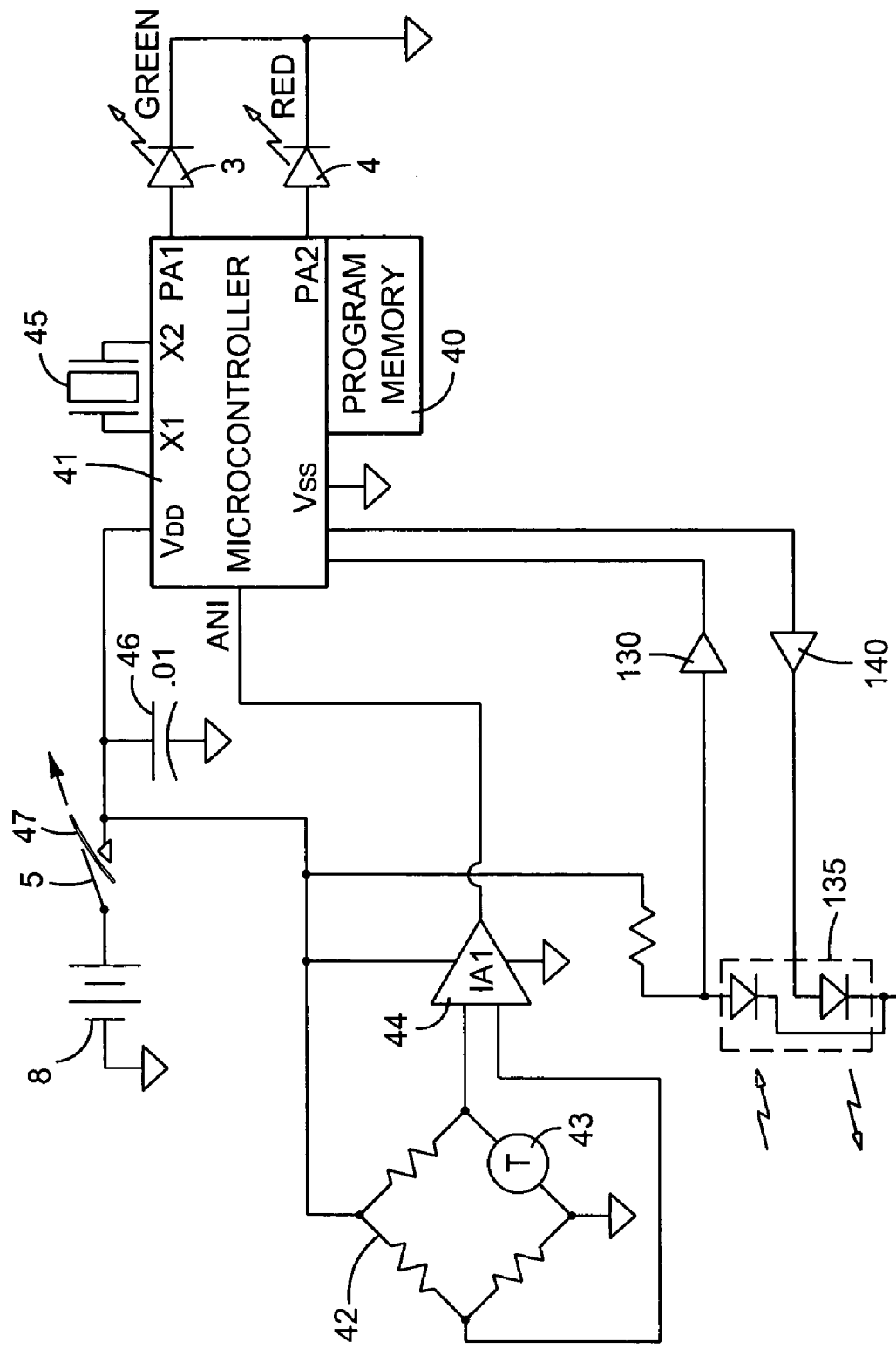
FIG. 15 is a schematic diagram of the circuit of an alternate embodiment of the invention that incorporates an infrared interface.

Similarly, FIG. 15 depicts an infrared (IR) interface for communications, where IR Emitter/Detector Device 135 emits IR signals coming from interface driver 140 and detects IR signals into interface receiver 130. Interface driver 140 and interface receiver 130 can be optionally incorporated into microcontroller 41. IR Emitter/Detector Device 135 may optionally be two separate elements.

It should be noted that the circuits of FIGS. 11 through 15 are based upon the circuit depicted in FIG. 5, but each of these figures incorporate additional peripheral circuitry as described above and hereafter referred to as "Extra-Peripheral Circuits" (EPC's). Microcontroller 41 in FIG. 5, by the nature of its flexible capabilities, allows for said EPC's to be incorporated. It would also be possible to incorporate EPC's into other semi-custom or full-custom integrated circuits that perform the time and temperature functions.

Therefore, it follows that the circuitry of FIGS. 11 through 15 can perform the described functions related to FIG. 5 involving time and temperature computation. Further, FIG. 11 can perform these functions simultaneously with the processing, intercommunication and/or storage of additional data to and from one or more types of EPC's that are incorporated into the present invention, as described in relation to FIGS. 11 through 15, above.

Although this invention has been described above with reference to particular means materials and embodiments, it is to be understood that the invention is not limited to these disclosed particulars, but extends instead to all equivalents within the broad scope of this Description, the Drawings, and the following Claims.

What is claimed is:

1. An electronics assembly for monitoring and alerting persons to the spoilage of perishable products, comprising:
   One or more oscillators or time-bases, and
   One or more batteries or energy cells, and
   An electronic monitoring and/or timing circuit comprising one or more environmental sensors coupled to a microcontroller,
   An extra-peripheral circuit coupled to an analog input of the microcontroller, the extra-peripheral circuit comprising data memory storage or timing peripheral circuitry, and
   One or more indicators, wherein:
   Each of said oscillators or time-bases and each of said monitoring and/or timing circuits is powered by said one or more batteries or energy cells, and each of said indicators is connected to said electronic monitoring and/or timing circuit, so that said assembly functions to perform time and/or time-temperature measurement and to provide alarm status at said one or more indicators when calculated alarm event times occur.

2. The assembly of claim 1, wherein the one or more environmental sensors comprise a temperature sensor.

3. The assembly of claim 1, wherein said one or more of said environmental sensors is selected from the group consisting of: a humidity sensor, a sensor that detects physical orientation, an acceleration sensor, a sensor of atmospheric pressure, a sensor of molecular compounds, and combinations thereof.

4. The assembly of claim 1, further comprising one or more integrated circuit devices that communicate with said microcontroller via a serial interface.

5. The assembly of claim 4, wherein one of said devices is a real-time clock.

6. The assembly of claim 1, further comprising circuitry to facilitate inter-communication of data with said microcontroller via one or two-way serial interface.

7. The assembly of claim 6, wherein said circuitry facilitates wireless radio frequency communication of data.

8. The assembly of claim 6, wherein said circuitry facilitates wireless infrared communication of data.

* * * * *